United States Patent [19]

Enochs et al.

[11] Patent Number: 4,818,056
[45] Date of Patent: Apr. 4, 1989

[54] OPTICAL CONNECTOR WITH DIRECT MOUNTED PHOTO DIODE

[75] Inventors: R. Scott Enochs, Hillsboro; Scott R. Jansen, Beaverton; Daniel R. Murphy, Beaverton; Randy S. Randall, Beaverton; Joanne Roth, Hillsboro, all of Oreg.

[73] Assignee: Tektronix, Inc., Beaverton, Oreg.

[21] Appl. No.: 20,269

[22] Filed: Mar. 2, 1987

[51] Int. Cl.$^4$ .............................................. G02B 6/42
[52] U.S. Cl. ............................... 350/96.20; 350/96.15
[58] Field of Search ............... 350/96.15, 96.17, 96.20; 250/227, 552; 357/17, 19, 30, 74, 80

[56] References Cited

U.S. PATENT DOCUMENTS

| | | | |
|---|---|---|---|
| 4,081,208 | 3/1978 | Meade | 350/96.20 |
| 4,179,801 | 12/1979 | Hollis | 350/96.20 X |
| 4,186,995 | 2/1980 | Schumacher | 350/96.20 |
| 4,188,708 | 2/1980 | Frederiksen | 350/96.15 X |
| 4,268,113 | 5/1981 | Noel | 350/96.20 |
| 4,273,413 | 6/1981 | Bendiksen et al. | 350/96.20 |
| 4,439,006 | 3/1984 | Stevenson | 350/96.20 |
| 4,547,039 | 10/1985 | Caron et al. | 350/96.20 |
| 4,707,067 | 11/1987 | Haberland et al. | 350/96.20 |

Primary Examiner—John D. Lee
Assistant Examiner—Phan Heartney
Attorney, Agent, or Firm—William S. Lovell; David P. Petersen

[57] ABSTRACT

An optical connector in accordance with the invention includes a body to which an optical fiber supporting ferrule is mounted. A photo diode is rigidly mounted to the connector such that the photo active portion of the photo diode is optically coupled to the optical fiber. An interface is provided between the photo diode and an electronic circuit. In one form of the invention, the electronic circuit is mounted to the optical connector to facilitate this interface. Alternately, the circuit may be remote from the connector. In this case, the connector includes at least one electrically conductive wire lead for connecting the photo diode to the electronic circuit. An apertured substrate may be used to mount the photo diode to the ferrule with the photo diode optically coupled to the optical fiber through the aperture. The structure may be capped for protection against the environment, or alternatively, the circuit board itself may provide protection to the opto-electronic interface.

18 Claims, 2 Drawing Sheets

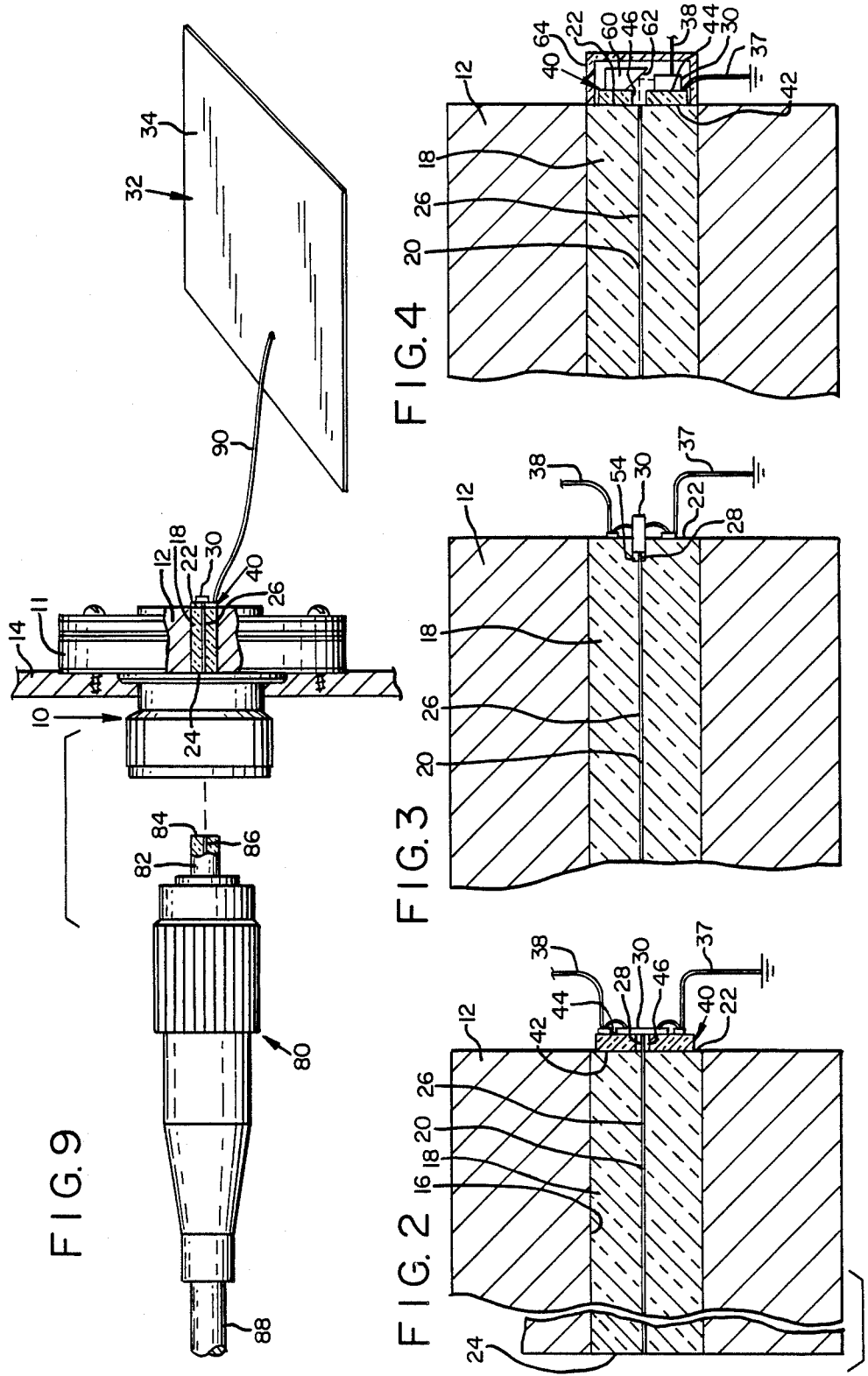

OPTICAL CONNECTOR WITH DIRECT MOUNTED PHOTO DIODE

BACKGROUND OF THE INVENTION

The present invention relates to optical connectors used in coupling optical elements, such as optical probes, to an electronic circuit.

In a typical prior art test instrument, an optical connector is mounted to a wall of the test instrument. Such a connector includes a body which supports a ceramic ferrule with an axial bore. An optical fiber is positioned in the bore and terminates flush with the respective ends of the ferrule. One or more relatively long optical fibers are mounted to an end of the ferrule with a first end of each fiber in optical communication with the fiber in the ferrule. The opposite ends of each of the fibers are connected to a circuit board in alignment with respective photo diodes on the board.

This prior art approach suffers from a number of disadvantages. For example, it is difficult to install an individual optical fiber on a circuit board in alignment with a photo diode on the circuit board. Automated robots may be used to interconnect electrically conductive wires to a circuit board. However, because of problems associated with aligning optical fibers with photo diodes, it is impractical, and heretofore virtually impossible, to use robots to mount optical fibers in alignment with photo diodes. Consequently, manual operations are required to perform this step. This increases the labor costs and time required to complete the optical connector to electronic circuit interface. In addition, optical fibers are relatively inflexible in comparison to electrically conductive wires. Consequently, when optical fibers are flexed and positioned for coupling to a photo diode on a printed circuit board or other circuit, strain exists at the connection point between the fiber and circuit. Furthermore, optical fibers are somewhat easy to break. Therefore, in some cases repeated attempts are required to successfully make an optical fiber to photo diode connection due to breakage of the fibers.

Therefore, a need exists for an optical connector which overcomes these and other drawbacks of the prior art and in particular which improves the coupling of an optical element to an electronic circuit.

SUMMARY OF THE INVENTION

An optical connector in accordance with the invention includes a body to which an optical fiber supporting ferrule is mounted. A photo diode is rigidly mounted to the connector such that the photo active portion of the photo diode is optically coupled to the optical fiber. An interface is provided between the photo diode and an electronic circuit. In one form of the invention, the electronic circuit is mounted directly to the optical connector to facilitate this interface. Alternately, the circuit may be remote from the connector. In this case the connector includes at least one electrically conductive wire lead which connects the photo diode to the electronic circuit.

In one preferred form of the invention, a photo diode mounting substrate is provided with an aperture. One surface of the substrate is mounted to an end of the ferrule with the aperture aligned with the optical fiber carried by the ferrule. The photo diode is mounted to another surface of the substrate with its photo active portion at least partially over the aperture and thereby optically coupled to the optical fiber. This overcomes the difficult alignment problems of the prior art as the photo diode is automatically coupled to the optical fiber through the aperture when the substrate is mounted in position.

Light emitting and light receiving diodes, including surface and edge emitting or receiving diodes, may be used. In addition, as a more specific aspect of the invention, a cap may be utilized to hermetically seal environmentally sensitive portions of the construction, such as electronic circuits and the photo diode to optical fiber interface. In one specific approach, an electronic circuit supporting substrate performs this sealing function. In addition, an improved method of manufacturing an optical connector in accordance with the present invention is disclosed.

It is accordingly one object of the invention to provide an improved optical connector and an improved method of manufacturing such a connector.

A further object of the invention is to provide an optical connector which minimizes the difficulties of aligning optical fibers to photo diodes.

A further object of the invention is to eliminate relatively long optical fibers used to couple an optical connector to an electronic circuit.

Another object of the present invention is to minimize signal path lengths between an optical connector and a photo diode.

A still further object of the invention is to provide a durable optical connector which is resistent to adverse environmental conditions.

These and other objects, features and advantages of the present invention will become apparent with reference to the following description and drawings.

BRIEF DESCRIPTION OF DRAWINGS

FIG. 2 is a side elevational view, partially in section, of the portion of the connector of FIG. 1 to which a photo diode is mounted.

FIG. 3 is a side elevational view, partially in section, of the portion of the connector of FIG. 1 to which a photo diode is mounted and showing an alternate manner of mounting a photo diode to the connector.

FIG. 4 is a side elevational view, partially in section, of the portion of the connector to which a photo diode is mounted and showing still another approach for mounting the photo diode to the connector.

FIG. 9 is a side elevational view of another form of optical connector in accordance with the present invention.

DETAILED DESCRIPTION OF PREFERRED EMBODIMENTS

Figure 1:
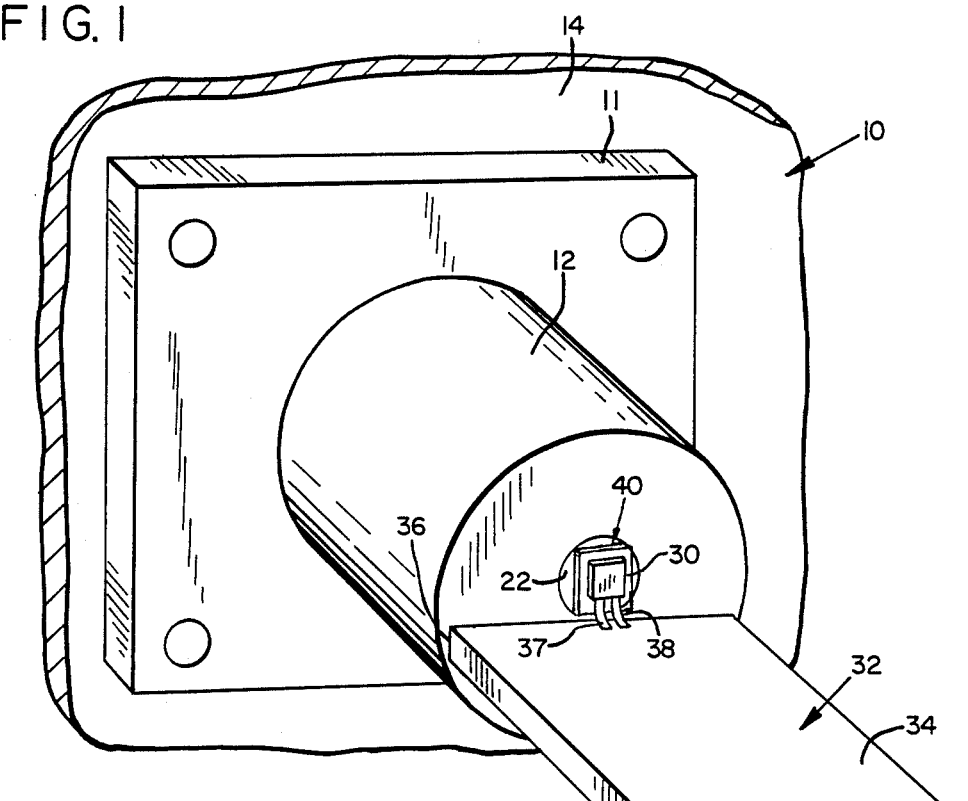
FIG. 1 is an isometric view of one form of a connector in accordance with the invention, including an electronic circuit mounted to the connector.

With reference to FIG. 1, one form of optical connector 10 in accordance with the present invention includes a mounting plate 11 from which a connector body 12 projects. Mounting plate 11 is typically secured to a wall 14 of the housing of equipment, such as test equipment, requiring an interface between optical elements and electronic circuits within the housing. Connector body 12 is typically of plastic or metal and includes an internal axially extending cylinder opening 16 as shown in FIG. 2. A ferrule 18, of ceramic or other suitable material, is positioned within this opening and secured to the connector body. This ferrule has an axially extending bore 20 extending from a first end surface 22 of the ferrule to a second end surface 24 thereof. An optical fiber 26 is positioned within bore 20 and, for purposes explained below, has a free end portion 28 extending a controlled amount beyond the end surface 22 of ferrule 18. Although exaggerated in FIG. 2, optical fiber 26 typically extends approximately one micron beyond the end surface 22. Except for the projecting end 28 of the optical fiber 26, prior art optical connectors are constructed as described to this point in the detailed description.

Referring again to FIG. 1, the connector 10 of the present invention includes a photo diode 30 rigidly mounted to the connector body. More specifically photo diode 30 is mounted to the end surface 22 of ferrule 18 such that the photo active portion of the photo diode is optically coupled to the optical fiber 26. As explained below, photo diode 30 may comprise a light receiving or light emitting diode, depending upon whether light is to be received by optical fiber 26 from an optical probe or other source or is to be transmitted from diode 30 along this optical fiber. An electronic circuit 32 on a substrate or circuit board 34 is mounted along an edge 36, as by epoxy, to the connector body 12. Leads 37, 38 electrically connect photo diode 30 to the circuit 32. Circuit 32 may comprise a commercially available circuit used in optical test equipment as well as any other electronic circuit requiring coupling to an optical input or output.

Figure 5:
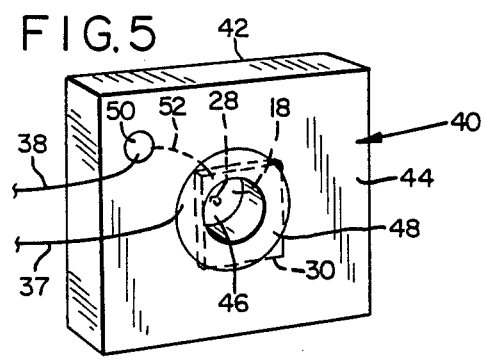
FIG. 5 is an isometric view of one form of a substrate used to mount a photo diode to the ferrule of a connector in accordance with the present invention.

In the form of the invention shown in FIG. 1, photo diode 30 is mounted to a substrate 40 which in turn is mounted to end surface 22 of ferrule 18 to thereby directly and rigidly mount the photo diode 30 to the connector body 12. Although not required, substrate 40 is typically of ceramic. In addition, as shown in FIG. 5, this substrate includes respective first and second parallel planar substrate surfaces 42 and 44 and has an aperture 46 extending between these surfaces. Aperture 46 is typically sized to be approximately the same size as the photo active area of photo diode 30, shown in dashed lines in FIG. 5 overlying aperture 46. The substrate 40 is mounted to ferrule 18, as by epoxy, with surface 42 of the substrate against the ferrule. When so mounted, the projecting end portion 28 of the optical fiber, also shown in dashed lines in FIG. 5, is positioned within the aperture. This automatically aligns the optical fiber with the photo active portion of photo diode 30. In addition, the photo active area of the diode is much greater in cross sectional dimension than the cross sectional dimension of the optical fiber. Therefore, aperture 46 has a correspondingly large cross sectional dimension. Consequently, it is relatively easy to position the substrate 40 so that the optical fiber end 28 is within the aperture 46. Moreover, there is no need to precisely center optical fiber end 28 within this aperture. That is, so long as the photo active portion of diode 30 at least partially covers the aperture, satisfactory optical coupling is achieved.

Typically, one surface of a photo diode, for example the front surface of the photo diode, comprises an electrical terminal of the diode. An electrically conductive area, such as an annular electrically conductive metalized layer 48 in FIG. 5, may be provided on surface 44 for making electrical contact with the front surface terminal of the diode when the diode is mounted in place. One of the leads 37 is then connected to layer 48, and thus to the front surface terminal, and to the electronic circuit. Another electrically conductive area, such as metalized area 50, may also be provided on surface 44 and is electrically insulated from area 48. A lead 52, indicated in dashed lines in FIG. 5, connects the other terminal of the diode at the back thereof to region 50. The lead 38 completes the connection of this latter diode terminal to the electronic circuit. Instead of metalized regions, electrically conductive epoxy may be used to secure the diode in place with leads 37, 38 being coupled to these epoxied areas. Of course, electrical contact with the photo diode may also be made in any other suitable manner.

With reference to FIG. 2, diode 30 is shown mounted to substrate 40 in the above-described manner to optically couple the photo active surface of the diode to optical fiber 26. The diode 30 of this figure is a surface type photo diode and may comprise either a light emitting or light receiving diode, depending upon the particular application. If diode 30 is a light receiving diode, optical fiber 26 is typically a multi-mode fiber. In contrast, if photo diode 30 constitutes a light emitting diode, optical fiber 26 is typically a single-mode fiber matched to optimize transmission of light of the frequency emitted by the diode. The procedure of optically matching optical fibers to the light emitted by a photo diode is known to those skilled in the art.

In the form of the invention shown in FIG. 3, a mechanism other than a substrate 40 is used to mount the photo diode 30 to a surface 22 of ferrule 18. More specifically, in this embodiment the diode 30 comprises an edge emitting diode. Also, the surface 22 of ferrule 18 is machined to form a diode receiving notch 54 in this surface. Notch 54 is aligned with the bore 20 that passes through ferrule 18. This notch is sized and shaped to receive the photo active end of the diode 30. The photo diode is then secured, as by epoxy or other mounting means, within the notch. The notch 54 is formed prior to the insertion of optical fiber 26 in bore 20. In addition, the optical fiber 26 is positioned in the bore 20 such that its free end 28 projects slightly beyond the base of notch 54. Consequently, when diode 30 is mounted in place, optical coupling between fiber end 28 and diode 30 is achieved.

Although somewhat more difficult to construct than the previously described embodiments, diode 30 may comprise an edge emitting diode mounted to the outer surface 44 of substrate 40 as shown in FIG. 4. A light directing means such as mirror 60 having a mirrored surface 62 is then positioned to direct light from the light emitting diode through aperture 46 and to the end of optical fiber 26. In addition, a hollow cap 64, which may be of glass, is mounted to end surface 22 of ferrule 18 to enclose and seal the optical fiber to photo diode interface. This shields the connector from dirt particles and other potentially damaging environmental substances.

Figure 6:
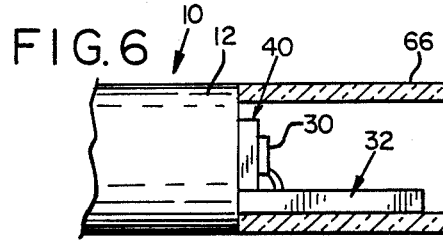
FIG. 6 is a side elevational view of the optical connector of FIG. 1, shown partially in section, which also includes a cap for sealing the construction.

As shown in FIG. 6, a similar hollow cap 66 may be used in connection with the FIG. 1 optical connector to seal the circuit 32 and other components of this form of connector. In this figure, the cap 66 is mounted, as by epoxy, to the surface of body 12 to thereby enclose and protect the sensitive components of the connector.

Figure 7:
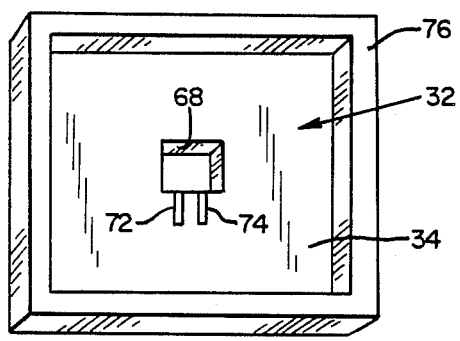
FIG. 7 illustrates a representative electronic circuit having a recess containing substrate or support, the substrate being adapted for mounting to an optical connector of the invention with the photo diode received in the recess so as to seal the construction.
Figure 8:
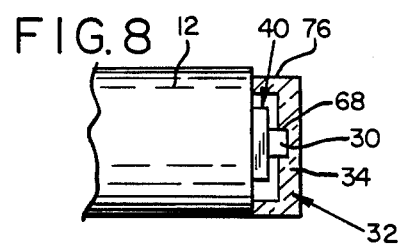
FIG. 8 is a side elevational view, partially in section, of the optical connector of FIG. 2 with the circuit of FIG. 7 mounted in position.

With reference to FIG. 7, the substrate or circuit board 34 that supports the electronic circuit 32 may be provided with a photo diode receiving recess 68. Recess 68 extends partially into the substrate. Electrical contacts 72, 74 are included to interconnect a photo diode received in recess 68 with the remaining electrical components of circuit 32. In addition, the circuit support or substrate 34 includes a peripheral rim 76 projecting outwardly from the remaining portions of the circuit support 34. As shown in FIG. 8, circuit support 34 is mounted to body 12 of the connector with the rim 76 abutting the body and with the photo diode 30 received within the diode receiving recess 68. With this construction, the circuit support 34 performs the dual function of carrying the electronic circuit and of sealing the photo diode to optical fiber interface and also the electronic circuit.

One form of optical to electrical coupling system in accordance with the present invention is shown in FIG. 9. In this form of the invention, a commercially available male-type input/output coupler 80 is shown having a ferrule 82 with an end surface 84 and an optical transmission fiber 86 positioned within a bore through the ferrule. Fiber 86 is optically coupled to one or more other fibers within a cord 88 leading to an optical probe. In this form of the invention, optical connector 10 comprises a female connection for receiving the coupler 80. When these components are interconnected, the surface 84 of ferrule 82 abuts the surface 24 of ferrule 18 with the optical transmission fiber 86 and optical fiber 26 in alignment with one another. In addition, in FIG. 9, the electronic circuit 32 is shown spaced or remote from the connector 10. One or more electrically conductive leads or wires 90 electrically interconnect the circuit 32 to the photo diode 30. Electrical wires 90, in contrast to optical fibers, may be readily connected to a circuit board using automated robots. In addition, such wires are more flexible and less inclined to break than optical fibers.

A preferred method for manufacturing the optical connector 10 includes the steps of inserting the optical fiber 26 into the bore 20 of ferrule 18 so that a length of fiber 28 protrudes from the end surface 22 of the ferrule. The diode 30 is mounted to the apertured substrate with the photo active portion of the diode at least partially covering the aperture and preferably totally covering the aperture. Although not required, this step is typically performed before the substrate is mounted in position to the end surface 22 of the ferrule, which also comprises a step in the manufacturing process. The substrate is mounted to the ferrule with the protruding optical fiber positioned within the aperture and thereby in optical communication with the photo diode. As another manufacturing step, an electric circuit may be mounted to the end of the ferrule, or equivalently to the end of the body of the connector, to facilitate the interconnection of the photo diode and electronic circuit.

Having illustrated and described the principles of our invention with reference to several preferred embodiments, it should be apparent to those persons skilled in the art that such invention may be modified in arrangement and detail without departing from such principles. We claim as our invention all such modifications as come within the true spirit and scope of the following claims.

We claim:

1. A through-wall optical connector for mounting to a wall of a housing at an opening through the wall and for receiving and making an optical connection to an input/output optical transmission fiber supported by an input/output coupler, the connector comprising:
    a body;
    body mounting means for mounting the body to the wall;
    a ferrule mounted to the body, the ferrule having first and second end surfaces and an axial optical fiber receiving bore extending between the ferrule end surfaces, the body supporting the ferrule such that the ferrule end surfaces are accessible from opposite sides of the wall through the wall opening;
    an optical fiber positioned within the bore;
    a photo diode;
    photo diode mounting means for rigidly mounting the photo diode directly to the body such that the photo active portion of the photo diode is optically coupled to the optical fiber adjacent the first end surface of the ferrule; and
    means mounted to the wall for receiving the input/output coupler and for positioning the input/output transmission fiber in optical communication with the optical fiber in the bore adjacent the second end surface of the ferrule.

2. An optical connector according to claim 1 in which the photo diode mounting means comprises a substrate having first and second substrate surfaces with an aperture extending from the first to the second substrate surfaces, the first substrate surface being mounted to the first end surface of the ferrule with the aperture aligned with the bore of the ferrule, and the photo diode being mounted to the second substrate surface so as to position the photo active portion of the photo diode at least partially over the aperture, whereby the photo diode is optically coupled to the optical fiber.

3. An optical connector according to claim 2 including a circuit board or other circuit support, an electronic circuit on the circuit support with diode interface means for coupling to the photo diode, and means for mounting the circuit support to the body with the photo diode coupled by the diode interface means to the electronic circuit.

4. An optical connector according to claim 3 in which the body has first and second body end surfaces and a body side surface, the ferrule extending between the first and second body end surfaces, the body mounting means comprising a mounting plate connected to the side surface of the body and mounted to the wall within the housing.

5. An optical connector according to claim 3 in which the circuit support has a first support surface which supports the electronic circuit and having a diode receiving recess, and the means for mounting the circuit support comprises means for mounting the circuit support with the photo diode received within the recess, together with means for mounting the first support surface to the body for sealing the electronic circuit and the photo diode.

6. An optical connector according to claim 2 for coupling the optical fiber to an electronic circuit in which the photo diode comprises a light receiving diode, the optical connector including at least one flexible electrical lead for connecting the photo diode to the electronic circuit.

7. An optical connector according to claim 1 in which the photo diode comprises an edge emitting photo diode, the photo diode mounting means comprising means for mounting the photo diode such that the photo active edge portion of the photo diode is optically coupled to the optical fiber.

8. An optical connector according to claim 1 in which the photo diode mounting means comprises a substrate having first and second substrate surfaces with an aperture extending from the first to the second substrate surfaces, the first substrate surface being mounted to the first end surface of the ferrule with the aperture aligned with the bore of the ferrule, the photo diode comprising an edge emitting photo diode mounted to the second substrate surface, and the photo diode mounting means including light directing means positioned for receiving light from the photo diode and directing this light through the aperture and to the optical fiber.

9. An optical connector according to claim 1 in which the photo diode mounting means comprises a diode receiving notch formed in a first end surface of the ferrule in alignment with the bore, the diode comprising an edge diode having a photo active edge portion, the notch being sized to receive the diode and position the photo active edge in alignment with the optical fiber, and the mounting means including means for securing the diode within the notch.

10. An optical connector according to claim 1 in which the photo diode mounting means comprises means for mounting the photo diode to a first end surface of the ferrule.

11. An apparatus according to claim 4 in which the mounting plate comprises an annular plate with a central opening for receiving and supporting the body with one of the body end surfaces and one of the female end surfaces projecting into and being exposed within the housing.

12. An optical to electrical coupling system for coupling an optical transmission fiber to an electronic circuit within a housing comprising:
 a first coupling having a first ferrule with a first internal bore for supporting the optical transmission fiber, the first ferrule having a coupling end surface through which the first bore exists from the first ferrule and through which the optical transmission fiber is visible;
 a second coupling which includes a body mounted to the housing, a second ferrule being mounted to the body, the second ferrule having first and second end surfaces and an axial optical fiber receiving second bore extending between the first and second end surfaces;
 an optical fiber positioned within the second bore;
 a photo diode;
 mounting means for rigidly mounting the photo diode directly to the first end surface of the second ferrule such that the photo active portion of the photo diode is optically coupled to the optical fiber at the first end surface of the second ferrule;
 interface means for electrically connecting the photo diode to the electronic circuit; and
 the body of the second coupling comprising means for interconnection with the first coupling so as to position the coupling end surface of the first ferrule adjacent to the second end surface of the second ferrule to optically couple the optical transmission fiber to the optical fiber within the second ferrule.

13. The system according to claim 12 including means for mounting the electronic circuit directly to the first end surface of the second ferrule.

14. A system according to claim 12 in which the interface means comprises at least one electrically conductive flexible wire.

15. A system according to claim 12 in which the mounting means comprises a substrate having first and second substrate surfaces with an aperture extending from the first to the second substrate surfaces, the first substrate surface being mounted to the first end surface of the second ferrule with the aperture aligned with the bore of the second ferrule and the photo diode being mounted to the second substrate surface so as to position the photo active portion of the photo diode at least partially over the aperture, whereby the photo diode is optically coupled to the optical fiber within the second ferrule.

16. A method of manufacturing a through-wall optical connector comprising:
 inserting an optical fiber into the bore of a ferrule having first and second end surfaces so that a length of fiber protrudes from the first end surface of the ferrule;
 mounting a diode to an apertured substrate with the photo active portion of the diode at least partially covering the aperture;
 mounting the substrate to the first end surface of the ferrule with the protruding optical fiber positioned within the aperture and thereby in optical communication with the photo diode; and
 mounting the ferrule to a connector body attached to an electronic housing such that the protruding optical fiber is positioned within said electronic housing.

17. A method according to claim 16 including the step of mounting an electronic circuit to the first end surface of the ferrule so as to interface with the photo diode.

18. A method according to claim 16 including the step of severing and polishing the optical fiber where it emerges from the second end surface of the ferrule so as to be flush with the second end surface.

* * * * *